US012710129B2

(12) United States Patent
Brinkley et al.

(10) Patent No.: US 12,710,129 B2
(45) Date of Patent: Aug. 18, 2026

(54) VEHICLE STAND

(71) Applicant: PICK-N-PULL AUTO DISMANTLERS, A CALIFORNIA GENERAL PARTNERSHIP, Portland, OR (US)

(72) Inventors: Michael Brinkley, El Dorado Hills, CA (US); Peter Joseph Weiss, Lodi, CA (US)

(73) Assignee: Pick-N-Pull Auto Dismantlers, Portland, OR (US)

( * ) Notice: Subject to any disclaimer, the term of this patent is extended or adjusted under 35 U.S.C. 154(b) by 0 days.

(21) Appl. No.: 18/552,413

(22) PCT Filed: Apr. 28, 2022

(86) PCT No.: PCT/US2022/071981
§ 371 (c)(1),
(2) Date: Sep. 25, 2023

(87) PCT Pub. No.: WO2022/232816
PCT Pub. Date: Nov. 3, 2022

(65) Prior Publication Data

US 2024/0117922 A1 Apr. 11, 2024

Related U.S. Application Data

(60) Provisional application No. 63/182,677, filed on Apr. 30, 2021.

(51) Int. Cl.
*B66F 3/00* (2006.01)
*F16M 11/22* (2006.01)

(52) U.S. Cl.
CPC ............... *F16M 11/22* (2013.01); *B66F 3/00* (2013.01)

(58) Field of Classification Search
CPC ... F16M 11/22; B66F 3/00; B66F 3/04; B66F 3/08; B66F 3/24; B66F 3/25; B66F 3/30
(Continued)

(56) References Cited

U.S. PATENT DOCUMENTS 1,810,726 A * 6/1931 Campbell ............... B66F 13/00 254/133 R
2,604,299 A * 7/1952 White ....................... B66F 3/12 254/133 R (Continued)

OTHER PUBLICATIONS

International Search Report and Written Opinion mailed Jun. 29, 2022, International Application No. PCT/US2022/071981, International Filing Date Apr. 28, 2022.

*Primary Examiner* — Nkeisha Smith
(74) *Attorney, Agent, or Firm* — Stoel Rives LLP

(57) ABSTRACT

The disclosed vehicle stands have a base, a top plate, and a mechanical stop on the top plate that hold a vehicle in a secure, suspended position above a surface, such as the ground or a floor. The top plate can be removable from the base. The base has two legs that extend away from the top plate. The top plate can be flat or contoured to compliment a shape of a vehicle resting upon it. The top plate can include additional securing elements, such as a friction that on a surface that contacts a suspended vehicle and a locking mechanism that attaches to the suspended vehicle. Multiple vehicle stands can be used together. Two of the multiple stands can be connected by a cross-bar that extends under the vehicle as it is suspended above the surface by the two respective top plates.

20 Claims, 10 Drawing Sheets

(58) Field of Classification Search
USPC .......................................................... 248/352
See application file for complete search history.

(56) References Cited

U.S. PATENT DOCUMENTS 3,074,693 A * 1/1963 Shumake .................. B66F 7/14 254/98
3,314,655 A * 4/1967 Steele ....................... B66F 3/10 254/102
3,493,209 A * 2/1970 Brammer ................ B66F 13/00 254/98
3,642,243 A * 2/1972 Smith .................. F16M 11/046 248/354.3
4,245,808 A * 1/1981 John ...................... F16M 11/28 248/165
4,690,361 A 9/1987 Lundman
4,759,660 A * 7/1988 Corbett ..................... B63C 5/02 248/354.3
4,882,887 A * 11/1989 Giles ................... E04B 1/34352 52/126.6
4,895,335 A * 1/1990 Oliver .................. F16M 11/046 248/354.3
5,297,779 A * 3/1994 Collins, Jr. ............... B66F 3/08 254/98
5,520,360 A * 5/1996 Wensman ............ F16M 11/046 248/188.5
5,639,067 A * 6/1997 Johnson ................. F16M 11/10 254/131
5,915,672 A * 6/1999 Dickey ..................... B66F 3/24 254/133 R
6,644,615 B1 * 11/2003 Liu ......................... B66F 13/00 248/346.07
6,902,148 B1 * 6/2005 Spencer .................... B66F 3/30 254/93 H
7,143,998 B1 * 12/2006 Hall .......................... B66F 3/08 254/98
7,147,211 B2 * 12/2006 Porter ....................... B66F 3/30 254/93 H
7,207,548 B1 * 4/2007 Howe ................. F21V 33/0084 254/98
7,694,921 B1 * 4/2010 Williams ............. F16M 11/046 248/161
7,878,482 B2 * 2/2011 Hernandez, Jr. .......... B66F 3/30 254/93 H
8,201,807 B2 * 6/2012 Hernandez, Jr. .......... B66F 3/24 254/133 R
8,231,108 B2 * 7/2012 Realegeno-Amaya .. B66D 1/08 254/134
8,398,056 B1 * 3/2013 Morrison .................. B66F 3/00 254/133 R
9,335,001 B1 * 5/2016 Ceravolo ................. B25H 1/06
9,428,372 B2 * 8/2016 Arif ........................ B65G 39/12
9,494,275 B2 * 11/2016 Crump ...................... B60T 3/00
9,725,286 B1 * 8/2017 Christopher, Jr. ...... B66F 13/00
10,894,531 B1 * 1/2021 Ceravolo .................. B66F 7/26
2009/0283653 A1 * 11/2009 Zhang .................. F16M 11/046 248/352
2023/0311819 A1 * 10/2023 Beaver ...................... B60S 9/04 280/763.1

* cited by examiner

VEHICLE STAND

CROSS-REFERENCE TO RELATED APPLICATIONS

This application is a 371 filing of International Patent Application No. PCT/US22/71981, filed Apr. 28, 2022, entitled "VEHICLE STAND," which claims priority and benefit from U.S. Provisional Patent Application 63/182,677, filed Apr. 30, 2021, and titled, "VEHICLE STAND" which is incorporated herein by reference in its entirety for all purposes.

BACKGROUND

Vehicles often need to be elevated from a surface for repair, maintenance, and inspection. Even personal vehicles weigh thousands of pounds and, when elevated, pose a safety risk to a human within a zone of danger of the elevated vehicle. Some applications like vehicle repair center or vehicle dealerships install large, permanent systems that securely lock and elevate vehicles to properly secure and position them for the desired repair, maintenance, and inspection. Such systems are typically only installed in large commercial settings and are operated only by skilled and trained technicians. These systems are also permanently installed in a location, expensive, heavy, and require their own periodic maintenance, repair, and inspections. Because of the expense, permanent installation, and operational requirements, these commercial systems are impractical for non-commercial use or use that may require a vehicle to be moved.

In many applications, vehicles need to be elevated for repair, maintenance, inspection, or other reasons but a smaller, less expensive system is required that does not demand a highly skilled operator for safe use. For example, many vehicle owners wish to perform repairs, maintenance, and inspections on their vehicles for personal use or in small commercial settings. Others wish to perform such tasks on vehicles that have been damaged beyond repair to disassemble certain portions of vehicles for parts recycling. The elevation techniques typically used in these settings include a pair of posts each with a tire placed on top of it. The posts are placed on opposing ends of the vehicles. The vehicle is not secured to the stand nor is either stand secured to the surface upon which it sits. Elevated vehicles slide from the post or the posts slide on the surface, both of which can cause the vehicle to slip off the stand and fall to the surface. When a vehicle falls to the surface, people can be seriously injured or die, especially if they are located within a close proximity of the falling vehicle.

There is a need in the industry to improve the safety of elevating vehicles using a low-cost, portable system.

BRIEF DESCRIPTION OF THE DRAWINGS

Non-limiting and non-exhaustive embodiments of the invention are described with reference to the following drawings. In the drawings, like reference numerals refer to like parts throughout the various figures, unless otherwise specified, wherein.

DETAILED DESCRIPTION

The disclosed vehicle stands secure vehicles in an elevated position to improve the safety and easy of providing maintenance, repair, and inspection of the elevated vehicle. Further, they provide portable options that reduce the storage and transport space required for the stands. The vehicle stands secure elevated vehicles anywhere along the vehicle to elevate it for various purposes, such as maintenance, repair, and inspection or for removal of parts, for example. People perform these tasks on the elevated vehicles. Their physical safety and ease of performing the tasks is improved with the disclosed vehicle stands. The vehicle stands suspend vehicles above a surface, such as the ground. The platform can be made any size, such as a 20" or more contact surface with the vehicle. The platform can be flat or contoured to mate with the shape of a portion of the vehicle it is intended to suspend above the surface.

Because of the weight they bear and the safety risk to humans that are in physical proximity to elevated vehicles using the disclosed vehicle stands, the stands are often made of a strong, rigid material(s), such as steel or another formidable metal. However, they can be made of metal alloys, composites, or the like that can provide the necessary weight-bearing qualities and safety requirements for the vehicles being elevated by the stands.

Figure 1:
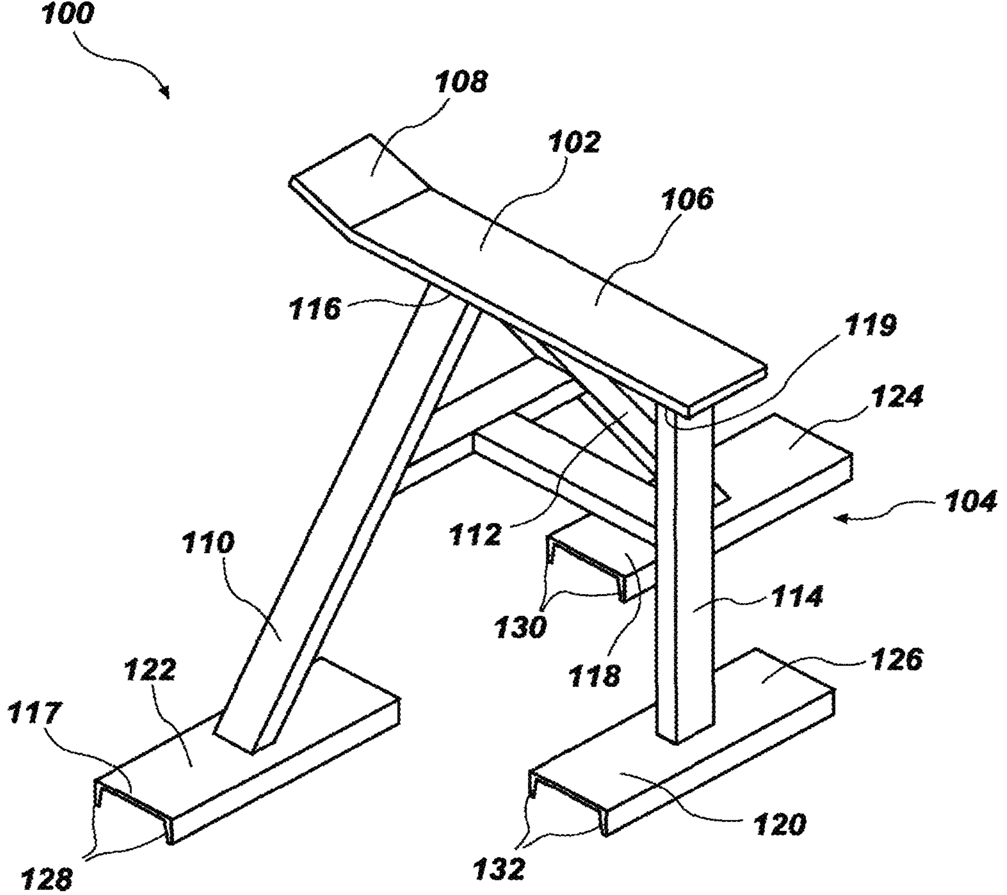
FIG. 1 is a perspective view of an example vehicle stand.

An example of a disclosed vehicle stand 100 has a platform 102 and a base 104, as shown in FIG. 1. The platform 102 supports the weight of a vehicle, such as an automobile, boat, farming or manufacturing equipment or the like. The platform 102 is positioned between an underside of the vehicle and the surface on which it sits, which is discussed in more detail below. The platform 102 is any suitable shape or size. In the example shown in FIG. 1, the platform 102 is flat and elongated. The platform 102 includes a main body portion 106 and a securing element 108. The main body portion 106 is placed beneath the main body of the vehicle at a desired location along its length. The securing element 108 is angled at an end of the main body portion 106 of the platform 102 and, when the main body portion 106 is supporting the elevated vehicle, prevents the body of the vehicle from substantial lateral movement by contacting a side surface of the vehicle as a mechanical stop. The platform 102 can include a releasable locking mechanism (not shown) that locks to a portion of the vehicle after the vehicle is in place, then releases to allow the vehicle to be removed from the stand. The locking mechanism can be mechanically controlled with a lock and key or automatically controlled via electronics that control it to restrict access to control of the lock. The locking mechanism allows for only authorized controllers to lock and unlock vehicles on the stands. The angle of the securing element 108 shown in FIG. 1 is 15° from the plane of the main body portion 106. In alternative example, the angle is any suitable angle up to and exceeding 90°.

FIG. 1 shows a base 104 attached to and supporting the platform 102. In this example, the based has three legs 110, 112, and 114. The base 104 can alternatively have any number of legs. In this example, two of the legs 110, 112 are attached to and extend away from the platform 102 at a first location 116 and the third leg 114 is attached to and extends away from the platform 102 at a second location 119 spaced apart from the first location. The distance between the first location 116 and the second location 119 can increase or decrease in other examples. The distance between the first location 116 and the second location 119 provides stability to the elongated platform 102 shown in FIG. 1. The configuration of the base 104—both the number of legs and the location(s) at which they attach to the platform 102—can vary depending on the shape and form of the platform 102.

In the example shown in FIG. 1, the two legs 110, 112 attached to the first location 116 of the platform 102 extend away from the platform 102 at an angle to form an "A" configuration with respect to the platform 102. In some examples, the apex of the angle of the "A" configuration is approximately 30°-60°. The two legs 110, 112 could be attached to the platform 102 at the first location 116 with a hinge that allows the first leg 110 and the second leg 112 to collapse during storage or shipping, for example. In the hinged d examples, a stabilizing bar can also be included that extends between the two legs 110, 112, such as a slip unit, joint, or coupler, to secure the two supports in a stable position during use. In other examples, the first leg 110 and the second leg 112 are fixed to the platform 102, such as by a weld. FIG. 1 shows an example with legs 110, 112, and 114 that have quadrilateral cross-section although alternatives could have a curved, circular, ovular, or other shape, with or without a hinge at the point they attach to the platform 102.

The third leg 114 attached to the second location 119 of the platform 102 at a right angle with respect to the platform 102. The A-configuration provides a wider base below the first location 116 than the third leg 114 attached to the platform 102 at the right angle. This configuration provides three points of contact between the base 104 and the surface on which it sits.

Each of the legs 110, 112, and 114 of the base 104 shown in FIG. 1 includes a footing 117, 118, and 120, respectively. In this example, the footings 116, 118, and 120 are each shaped and structured the same; however, footings could be shaped and structured differently. For example, one footing could have a mechanism that pierces the surface on which the vehicle stand 100 sits while another footing(s) could have a grip that contacts the surface on which the vehicle stand 100 sits. The footings 116, 118, and 120 shown in FIG. 1 each have an elongated flat portion 122, 124, and 126 each with a pair of lateral side walls 128, 130, and 132 that extend at right angles from the elongated flat portions 122, 124, and 126 to contact the surface on which the vehicle stand 100 sits. The lateral side walls 128, 130, and 132 taper to a point or rounded edge in this example to pierce the surface on which the vehicle stand 100 sits, which is often an outdoor surface like some combination of dirt and gravel. That piercing capability of the lateral side walls 128, 130, and 132 prevents lateral movement of the vehicle stand 100 because it extends into the surface by some distance, especially when the weight of the vehicle is atop the vehicle stand 100.

Figure 2A:
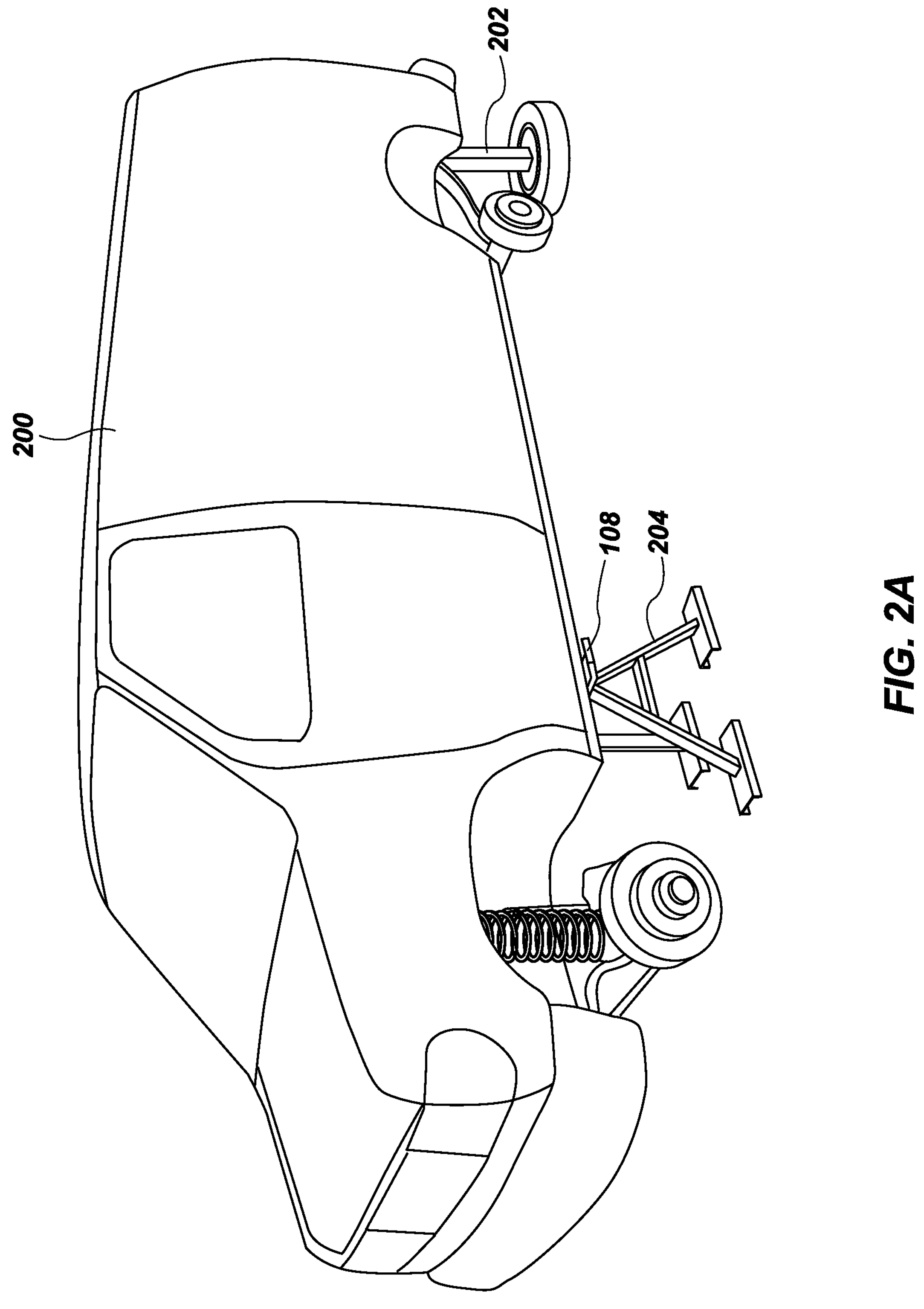
FIG. 2A shows an example vehicle stand and a conventional stand supporting a front and rear area of a vehicle to suspend it above a surface.

FIG. 2A shows a vehicle elevated on three vehicle stands 202, 204 (third stand is not shown in this view). The first vehicle stand 202 is positioned underneath the rear of the vehicle 200 in a center portion to approximately balance the weight of the backend of the vehicle 200. At the opposing front end of the vehicle 200, two disclosed vehicle stands 204 are placed on either side of the vehicle 200. The embodiments of the vehicle stand 204 shown in FIG. 2A is shown in FIG. 1. The two front end vehicle stands 204 and the opposing stand that is not shown, provide support to elevate the vehicle 200 at the front end. The securing elements of each of the front end vehicle stands, 204 and the one not shown, help reduce lateral movement of the vehicle when it is elevated on the stands. Without these securing elements 108, the vehicle would be free to move laterally and could slip off the stands. Further, because there are two stands as opposed to a single stand configuration, the support to elevate the vehicle is distributed across the front end of the vehicle 200 rather than concentrated at a single point. The conventional rear end vehicle stand 202 concentrates the support to elevate the vehicle at a single, central location. Typically, the conventional rear end vehicle stands 202 have been used on both ends of the vehicle so the lateral movement restriction offered by the two front end distributed A-frame configuration vehicle stands 204 and the opposing stand that is not shown, improves the likelihood that the vehicle will remain in place when it is elevated on the vehicle stands 204.

Figure 2B:
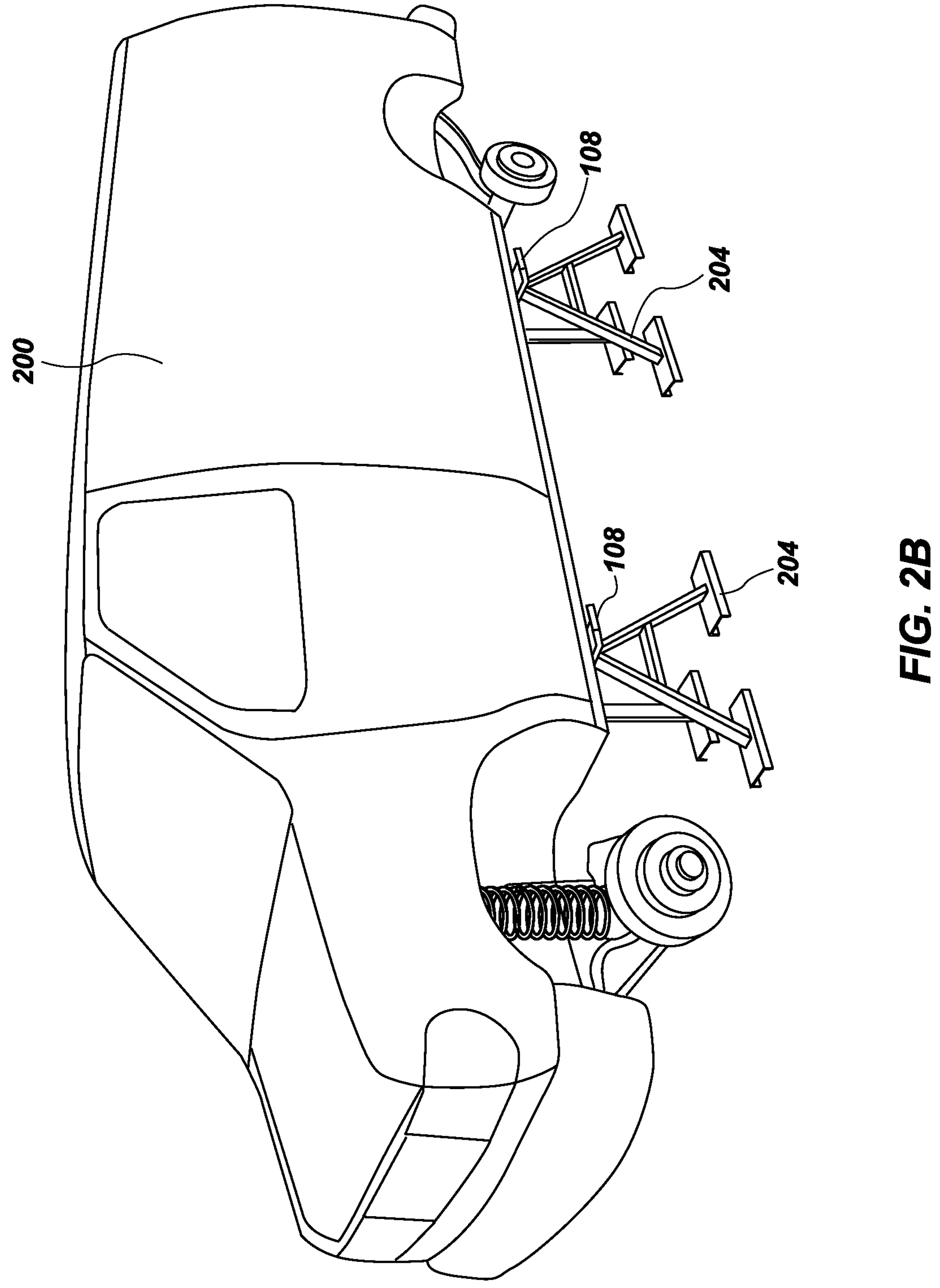
FIG. 2B shows two example vehicle stands supporting a vehicle at both the front and rear area to suspend it above a surface.

FIG. 2B shows an elevated vehicle 200 with two sets of the A-frame configuration vehicle stands 204—one pair on opposing sides of the front end of the vehicle 200, similar to the embodiment shown in FIG. 2A, and the second pair on opposing sides of the rear end of the vehicle 200, replacing the conventional centrally positioned vehicle stand 202 shown in FIG. 2A. This configuration of FIG. 2B distributes the support to elevate the vehicle 200 at both the front end and the back end of the vehicle and provides restricted lateral movement through the securing elements 108 on each pair of vehicle stands 204 to further improve the likelihood that the vehicle will remain elevated on the vehicle stands 204.

Figure 3A:
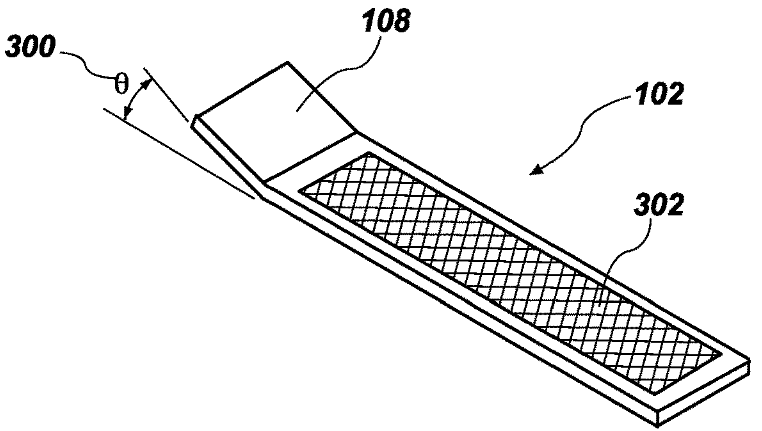
FIG. 3A is an example top plate of a disclosed vehicle stand.
Figure 3B:
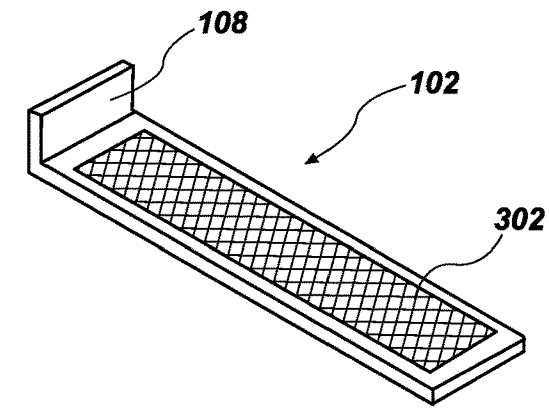
FIG. 3B is another example top plate of a disclosed vehicle stand.
Figure 3C:
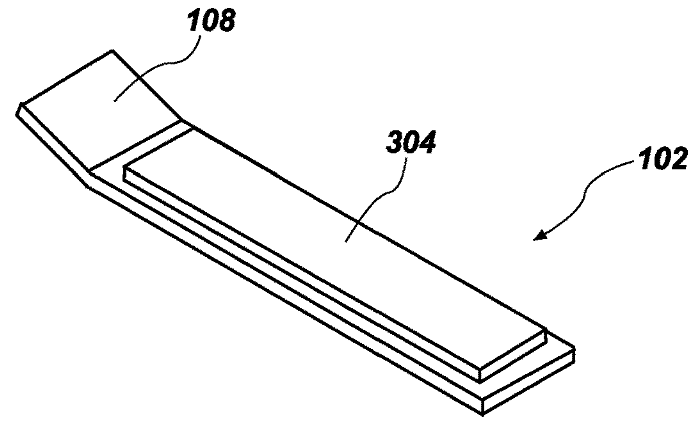
FIG. 3C is yet another example top plate of a disclosed vehicle stand.

FIGS. 3A-3C show various mechanical elements that can be placed on the flat surface of the platform 102 of the vehicle stands 100, 204 that contact the vehicle 200. These mechanical elements provide increased friction force or hard mechanical stops to reduce or eliminate movement of the vehicle 200 when elevated on the vehicle stand 100, 204. FIG. 3A shows a platform 102 having an angle θ 300 that is approximately 15° from the plane of the platform 102. The angled securing element 108 provides a mechanical stop or reduction in lateral movement when a vehicle 200 is elevated on the vehicle stand 100, 204. The platform 102 shown in FIG. 3A also includes an anti-skid pad 302 that has a lattice of ridges that contact the elevated vehicle 200. Alternatively, the platform 102 can include a grate that serves as an anti-skid pad.

FIG. 3B shows another platform 102 similar to the platform 102 shown in FIG. 3A except its securing element 108 is at a right angle with respect to the platform 102. The embodiment shown in FIG. 3B has the same anti-skid pad 302 as the embodiment shown in FIG. 3A that helps maintain the vehicle 200 in an elevated position. FIG. 3C is yet another example platform 102 that has an angled securing element 108 that is approximately 15° from the plane of the platform 102 to provide the same lateral movement prevention as the embodiment shown in FIG. 3A. This platform 102 also includes an attenuation pad 304 that is placed along the flat surface of the platform 102. The attenuation pad 304 absorbs some of the force of the weight of the elevated vehicle 200 and provides an intermediate layer between the vehicle 200 and the platform 102 to reduce lateral movement of the vehicle when it is elevated. Any suitable mechanical mechanism or layer can be added to increase friction or prevent lateral movement of the elevated vehicle with respect to the platform 102.

Figure 4A:
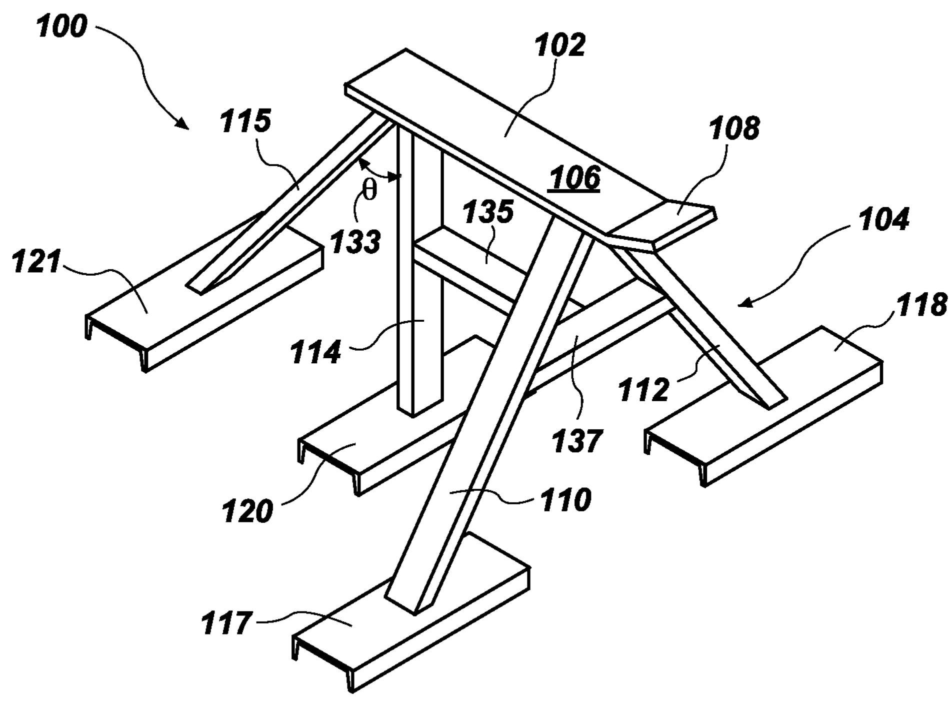
FIG. 4A is an example base of a disclosed vehicle stand.
Figure 4B:
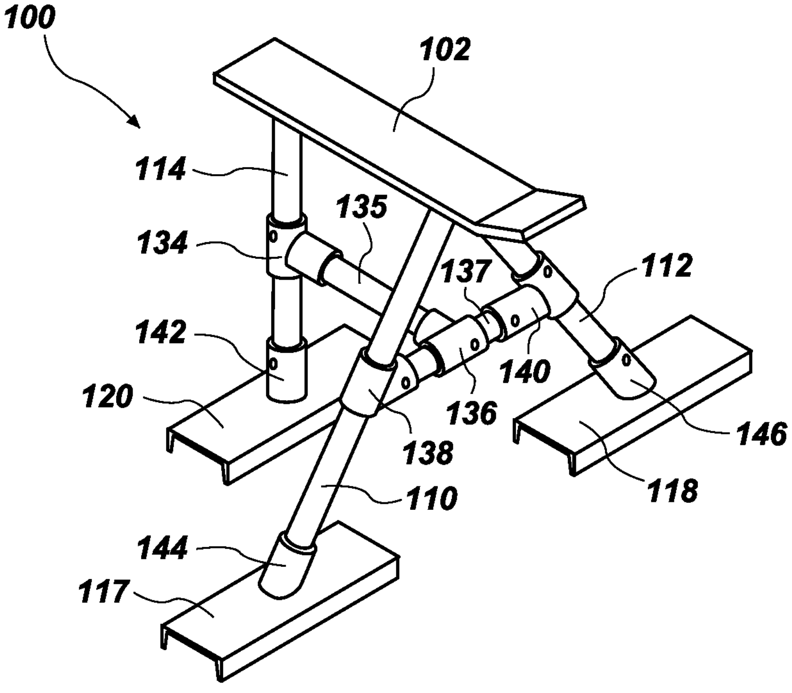
FIG. 4B is another example base of a disclosed vehicle stand.

Turning now to FIGS. 4A and 4B, shown are alternative base configurations for the disclosed vehicle stands. FIG. 4A shows a vehicle stand 100 with the same configuration of FIG. 1 except it has a fourth leg 115 with a corresponding footing 121. In this example, the fourth leg 115 and the corresponding footing 121 are the same embodiment as the first leg 110, the second 112, and the third leg 114 and their corresponding footings 117, 118, and 120. In alternative examples, the legs or the footings could be different embodiments. In this example, the fourth leg 115 extends away from the platform 102 at an angle θ 133 from the third leg 114. The footprint of the vehicle stand 100 shown in FIG. 4A is greater in length and width than the platform 102 extends to support the vehicle when elevated, which gives the vehicle a stable, wider base than a post like the conventional vehicle stand 202 shown in FIG. 2A.

FIG. 4B is a similar configuration to the vehicle stand 100 shown in FIG. 1 except it includes components that can be fitted together at various joints 134, 136, 138, 140, 142, 144, and 146. Joints 134, 136 are T-joints that connect a cross-bar 135 to an A-bar 137 that extends between the first leg 110 and the second leg 112. The cross-bar 135 secures the third leg 114 to the first leg 110 and the second leg 112. The first leg 110, second leg 112, third leg 114, and fourth leg 115 can be detached from the cross-bar 135 and the A-bar 137 when these joints are detached 134, 136. Further, the first leg 110 is attached to the joint 138 and can be detached from the A-bar 137 at the same joint 138 when needed. Similarly, the second leg 112 is attached to the joint 140 and can be detached from the A-bar at the same joint 140. The first leg 110 and the second leg 112 also have respective joints 144, 146 to attached to their respective footings 117, 118. The first leg 110 and the second leg 112 can be detached from their respective footing joints 144, 146 to remove or detach the footings 117, 118, from the legs 110, 112. Likewise, the third leg 114 is attached to and detachable from its footing 120 via a joint 142. This modular nature of the legs 110, 112, and 114 being attached to but detachable from their respective footings 117, 118, and 120 allows the vehicle stand 100 to be disassembled, such as for easy storage or transport, for example.

Figures 5A, 5B, 5C:
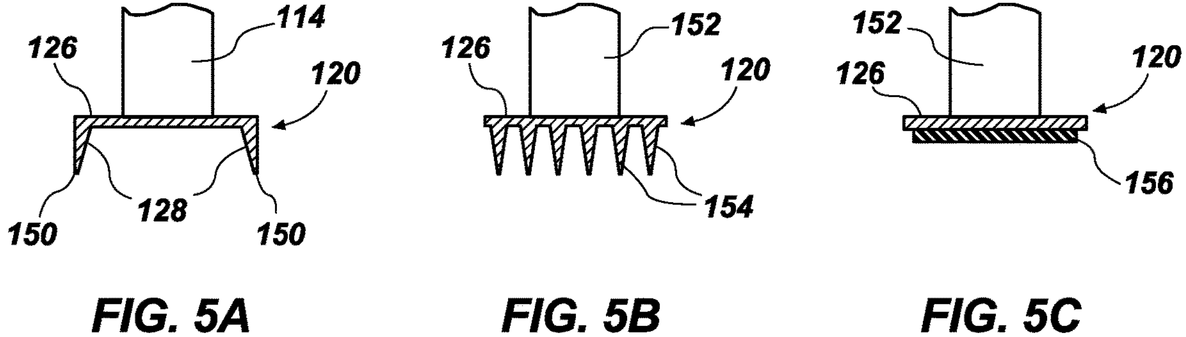
FIG. 5A is an example foot of a disclosed vehicle stand.
FIG. 5B is another example foot of a disclosed vehicle stand.
FIG. 5C is yet another example foot of a disclosed vehicle stand.

Turning now to FIGS. 5A-5C, the footings of each leg of the vehicle stand 100 has a configuration that may include a gripping element to improve the ability of the footing to be stationary with respect to the surface on which the vehicle stand 100 sits. For example, FIG. 5A includes the embodiment of the exemplary footing 120 of the third leg 114 of the vehicle stand 100 shown in FIG. 1. This footing 120 has an elongated platform 126 with two opposing, lateral side walls 128 that extend away from the elongated platform 126. The lateral side walls 128 are tapered as they extend towards the surface on which the vehicle stand 100 sits. The tapered ends 150 of each lateral side wall 128 comes to a narrower point that contacts the surface to provide some grip between the vehicle stand 100 and the surface. For example, the vehicle stand 100 is often placed on a soft surface, such as dirt, gravel, or grass. The tapered ends 150 of each lateral side wall 128 pierces or causes the surface to flex to provide more grip and increased friction required to cause lateral movement of the footing 120 and thus the entire vehicle stand 100.

FIGS. 5B and 5C show alternative example footing embodiments. The configuration shown in FIG. 5B includes multiple tapered spikes 154 that extend away from the elongated platform 126 towards the ground. Like the tapered ends of the embodiment shown in FIG. 5A, these tapered spikes 154 pierces the surface or cause it to flex to provide improved gripping and increased friction required to cause lateral movement of the footing 120 and thus the entire vehicle stand 100. FIG. 5C includes another footing embodiment in which a grip layer 156 is attached along the length of the elongated platform 126. The grip layer 156 can be any suitable material that causes increased friction between the elongated platform 126 of the footing 120 and the surface on which it sits. This type of grip layer embodiment of the footing helps provide increased friction in many environment, especially smooth surfaces such as concrete, asphalt, and a garage floor of any kind.

Figure 6:
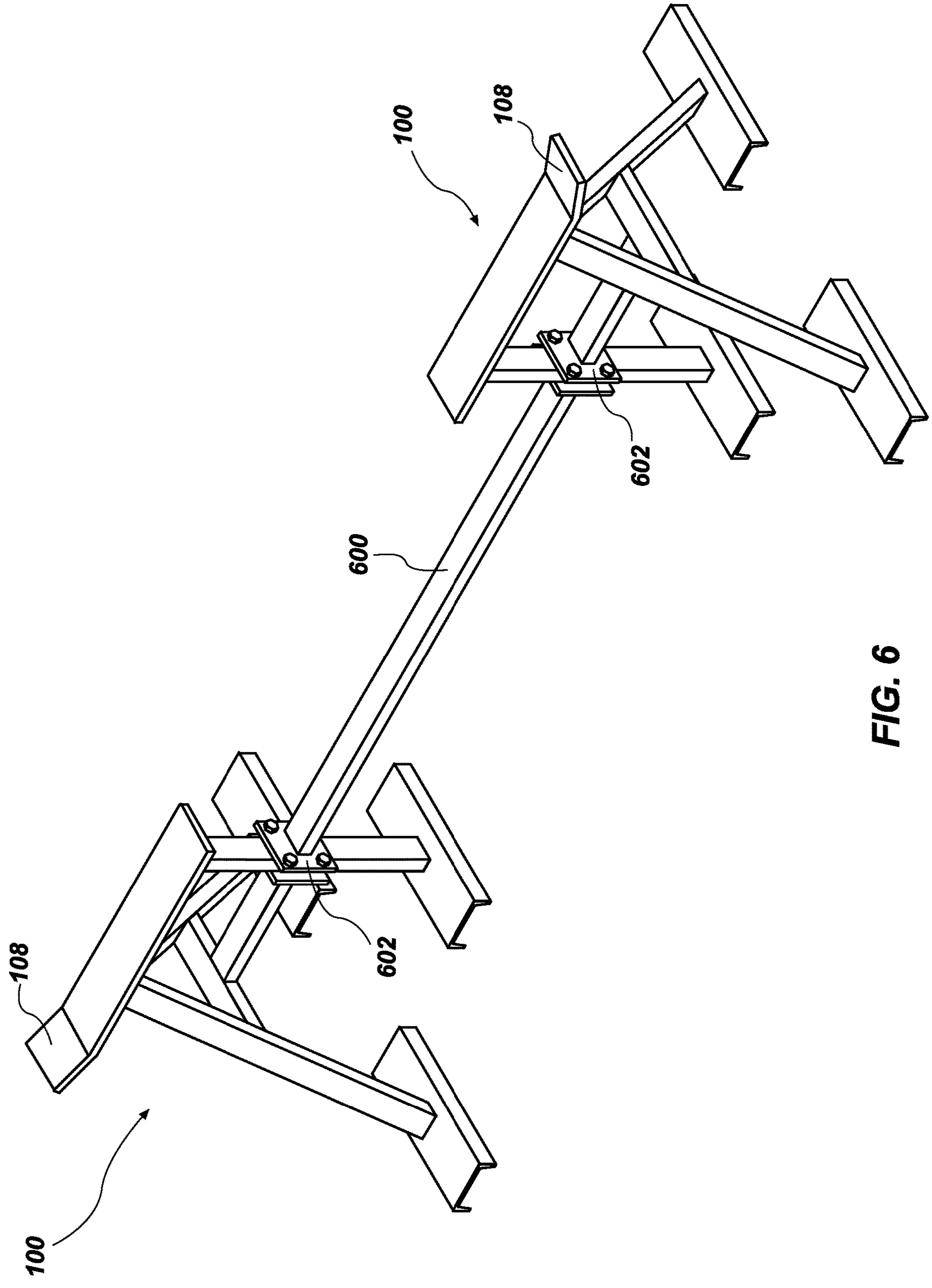
FIG. 6 is a perspective view of two example vehicle stands with an attached center beam.
Figure 7:
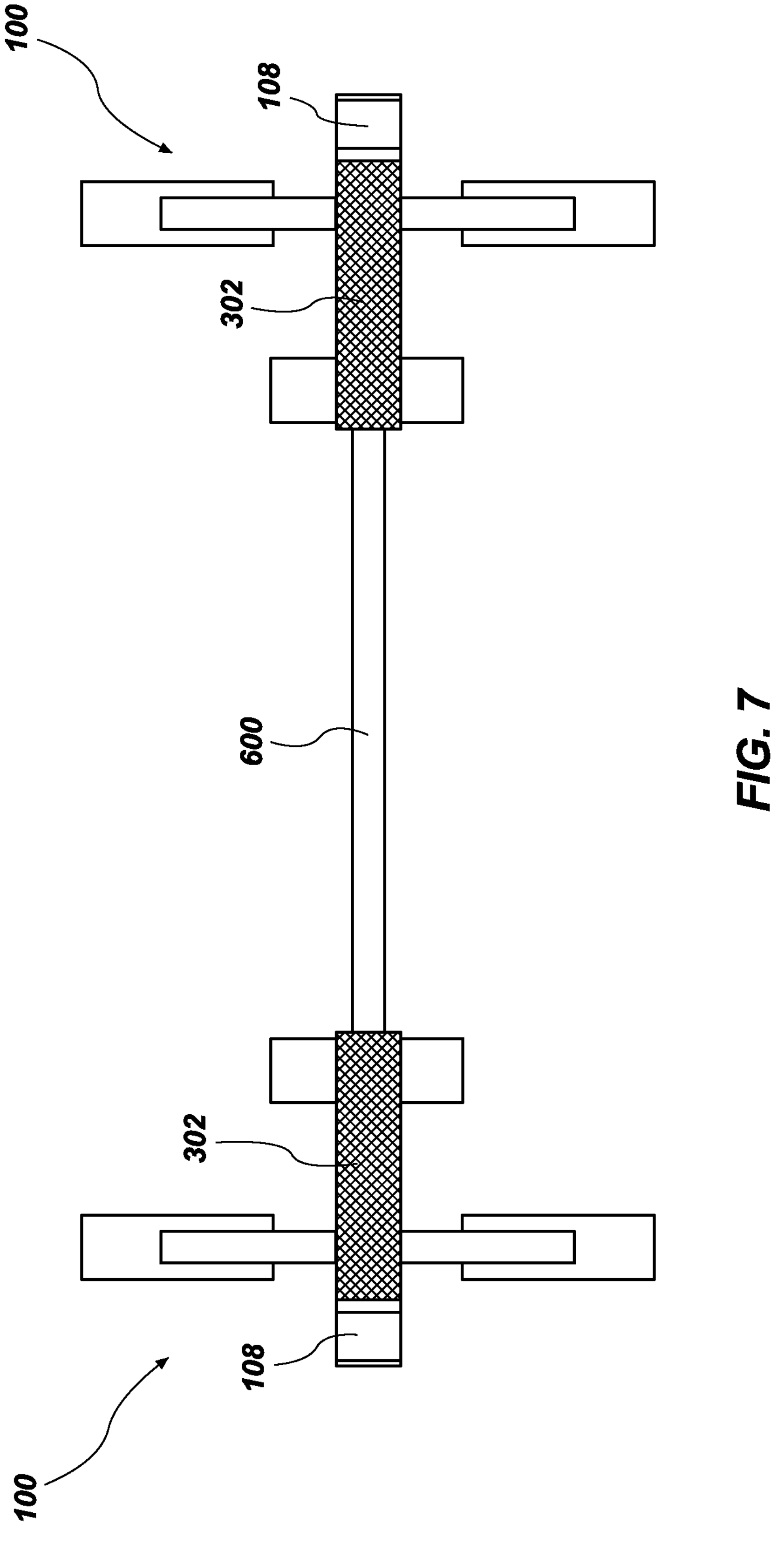
FIG. 7 is a top plan view of the two example vehicle stands shown in FIG. 6.
Figure 8:
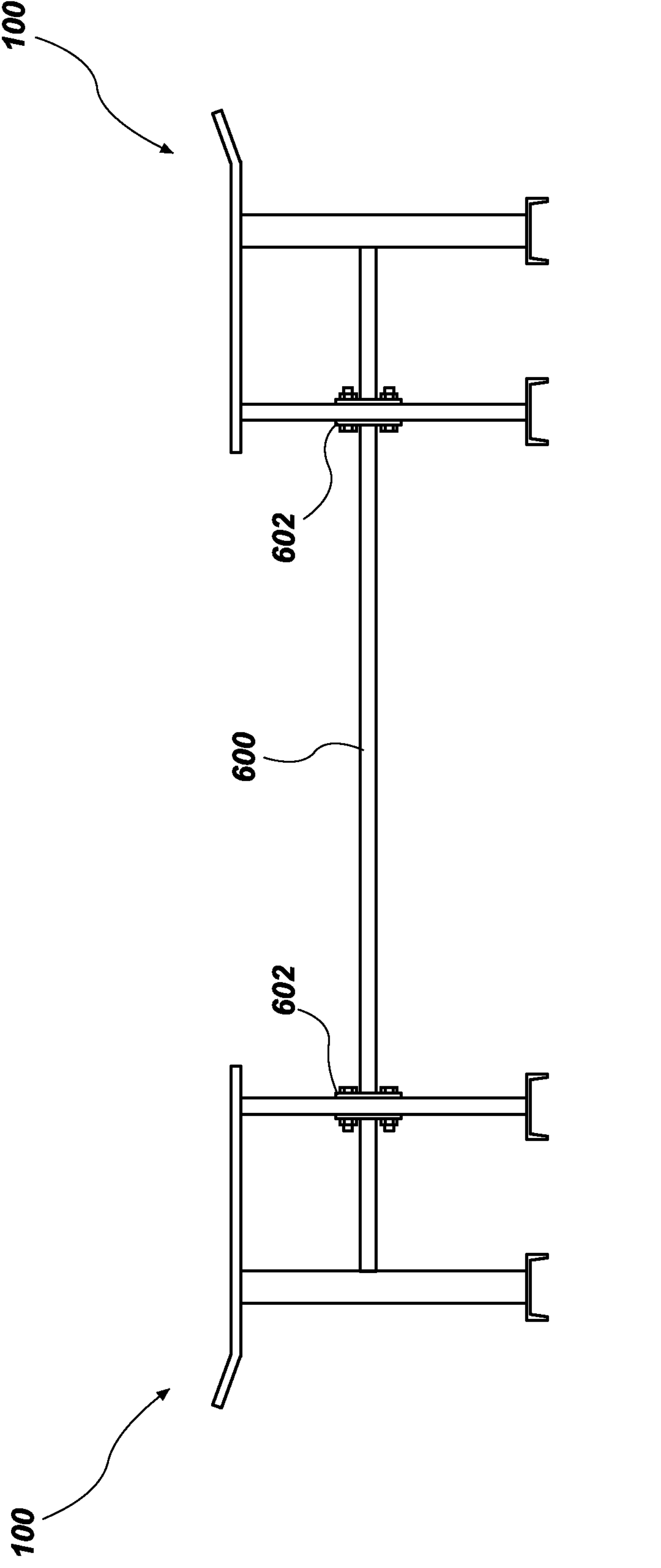
FIG. 8 is a side plan view of the two example vehicle stands shown in FIG. 6.

FIGS. 6-8 show an embodiment with two opposing vehicle stands 100, 100 connected by a support beam 600. For clarity, the example vehicle stands 100, 100 shown in FIGS. 6-8 are the same embodiment as the vehicle stand 100 shown in FIG. 1. Any other embodiment of vehicle stand 100, 204 could be substituted for one or both of the vehicle stands 100, 100 shown in FIG. 6. The two vehicle stands 100, 100 can be the same or different embodiments. The securing elements 108 of each vehicle stand 100 angle towards the support beam 600, which is also towards a center portion of the vehicle 200 when a vehicle 200 is elevated on the vehicle stands 100, 100. The support beam 600 secures the two vehicle stands 100, 100 to each other to align the vehicle stands 100, 100 with respect to each other beneath the vehicle 200. The securing elements 108 provide a mechanical stop or mitigation of lateral movement of the vehicle 200 in either direction.

The support beam 600 is secured to both of the vehicle stands 100, 100 by a plate and set of bolts 602. The plate and bolts 602 is removeable from both the support beam 600 and each respective vehicle stand 100 in this example. In other examples, the plate and bolts 602 can be removeable from either the support beam 600 or one or both of the vehicle stands 100, 100. The plate and bolt 602 is shown in FIG. 6 although other detachable securing elements can be substituted on one or other sides of the support beam 600, as desired. The support beam 600 extends below the vehicle when it is elevated but does not physically contact the vehicle 200. Its purpose is to align and stabilize the two vehicle stands 100, 100 with respect to each other.

FIG. 7 shows a top plan view of the disclosed embodiment with two opposing vehicle stands 100, 100 connected by the support beam 600 that is shown in FIG. 6. This top plan view also shows an anti-skid pad 302 atop the main body portion 106 of the platform 102, as shown in the example platform 102 shown in FIGS. 3A and 3B. FIG. 8 shows a side view of the disclosed embodiment with two opposing vehicle stands 100, 100 connected by the support beam 600 that is shown in FIG. 6.

Figure 9A:
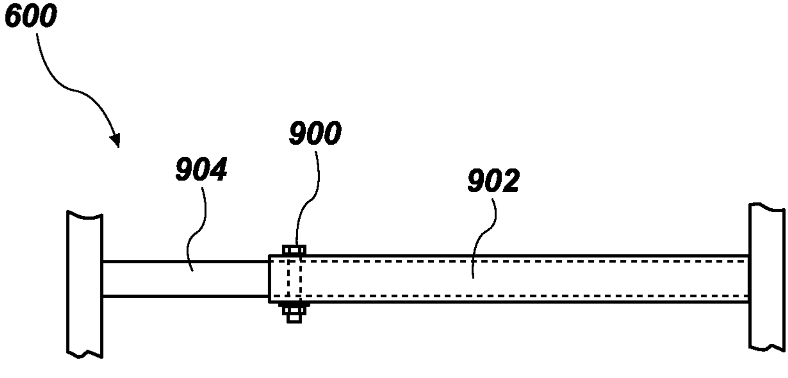
FIG. 9A is an example cross-bar of a disclosed vehicle stand.
Figure 9B:
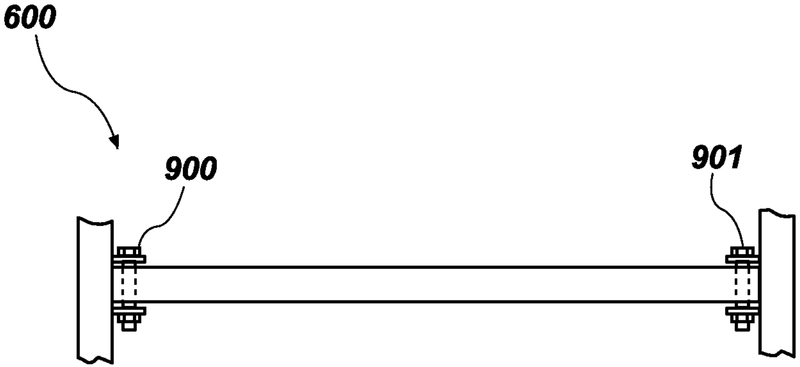
FIG. 9B is another example cross-bar of a disclosed vehicle stand.

FIGS. 9A and 9B show another embodiment of the support beam 600 whose length can vary depending on where the adjustment element 900 is positioned along the length of the support beam 600. In this example, the support beam 600 includes two telescoping pieces 902, 904 with one 904 fitting into the other 902 to adjust its length, as desired. The support beam 600 in FIG. 9A is positioned in an extended position in which a portion of one of the telescoping pieces 904 is exposed while another portion is fitted within the cavity of the second piece 902. FIG. 9B shows an example support beam 600 with two adjustment elements 900, 901. These adjustment elements 900, 901 are positioned in their retracted position, which is as short of a distance between the vehicle stands as possible. When permitted, these adjustment elements 900, 901 cause the support beam 600 to telescope (not shown) to extend its length. Vehicles of different makes and models have different widths. Varying the length of the support beam 600 allows a user to correlate the length to the width of the vehicle being elevated. Correlating the support beam 600 length with the width of the vehicle provides a desired tolerance of space between the vehicle side surface and the securing elements 108 of the vehicle stands to keep the lateral movement to a minimum. This managed lateral movement decreases the likelihood that the vehicle will slip from the vehicle stand and improves the safety of the system. Any adjustable support beam can include a locking mechanism to secure the beam in the desired position.

These and other features of the disclosed novel vehicle stands provide improved stability of the vehicles and access to vehicle parts when placed on the stands. The stability improves the safety for people using these vehicle stands to avoid catastrophic or other injuries. Their modular nature allows for easy storage, shipping, and repair of the stands.

Though certain elements, aspects, components or the like are described in relation to one embodiment or example, such as an example vehicle stand, those elements, aspects, components or the like can be included with any other vehicle stand, such as when it desirous or advantageous to do so.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific embodiments are presented by way of examples for purposes of illustration and description. They are not intended to be exhaustive of or to limit this disclosure to the precise forms described. Many modifications and variations are possible in view of the above teachings. The embodiments are shown and described in order to best explain the principles of this disclosure and practical applications to thereby enable others skilled in the art to best utilize this disclosure and various embodiments with various modifications as are suited to the particular use contemplated.

Though certain elements, aspects, components or the like are described in relation to one embodiment or example, such as an example system, those elements, aspects, components or the like can be including with any other systems, such as when it desirous or advantageous to do so.

What is claimed is:

1. A vehicle stand system comprising:

a base including a first leg, a second leg, and a third leg each spaced apart from one another; and a platform coupled to the base, the platform including a top surface, a first end with a first end face, an opposite second end with a second end face, and a main body portion extending along a horizontal axis between the first end and the second end, wherein the first end of the platform includes a mechanical stop extending upwardly from the top surface to the first end face, wherein the second end of the platform is substantially planar and extends along the horizontal axis in alignment with the main body portion, and wherein the second end face is substantially orthogonal relative to the horizontal axis and the top surface of the platform, the second end face of the second end vertically offset from the first end face of the first end, wherein the first leg and the second leg are positioned underneath a first portion of the platform at or adjacent the first end and the third leg is positioned underneath a second portion of the platform at or adjacent the second end.

2. The system of claim 1, wherein the first leg and the second leg are arranged in an A-frame configuration.

3. The system of claim 1, wherein the platform is coupled directly to each of the first leg, the second leg, and the third leg.

4. The system of claim 1, wherein the mechanical stop is a planar or contoured plate that extends upwardly from the platform at an angle.

5. The system of claim 4, wherein the angle is an obtuse angle.

6. The system of claim 4, wherein the angle is a right angle.

7. The system of claim 1, further comprising a friction layer or friction element coupled to or formed on the top surface of the platform.

8. The system of claim 1, further comprising:

a first foot having an elongated foot platform on a top portion thereof, wherein the first leg of the base is coupled to the first foot along the elongated foot platform, the foot platform further including a first wall and a second wall spaced apart from one another and each extending downwardly from an underside thereof; and a second foot having an elongated foot platform on a top portion thereof, wherein the second leg of the base is coupled to the second foot along the elongated foot platform, the foot platform further including a first wall and a second wall spaced apart from one another and each extending downwardly from an underside thereof.

9. The system of claim 1, further comprising:

a first foot having an elongated foot platform on a top portion thereof, wherein the first leg of the base is coupled to the first foot along the elongated foot platform, and wherein the elongated foot platform further includes an anti-skid layer disposed along an underside thereof; and a second foot having an elongated foot platform on a top portion thereof, wherein the second leg of the base is coupled to the second foot along the elongated foot platform, and wherein the elongated foot platform further includes an anti-skid layer disposed along an underside thereof.

10. The system of claim 1, wherein the base includes a first cross-bar extending across and coupling the first leg and the second leg, the base further including a second cross-bar extending from the first cross-bar to the third leg, the second cross-bar coupling the third leg with the first cross-bar.

11. The system of claim 10, wherein the first cross-bar and the second cross-bar each includes a releasable mechanical connector, wherein the releasable mechanical connector of the first cross-bar is operable to releasably couple the first leg with the second leg, and wherein the releasable mechanical connector of the second cross-bar is operable to releasably couple the first cross-bar with the third leg.

12. The system of claim 1, further comprising a locking element attached to the platform.

13. The system of claim 1, wherein the platform is removable from the base.

14. The system of claim 1, the base further including a fourth leg, wherein the first leg and the second leg are coupled directly to the platform underneath the first portion thereof, and wherein the third leg and the fourth leg are coupled directly to the platform underneath the second portion thereof.

15. A vehicle stand system comprising:

a first base including a first leg and a second leg spaced apart from one another; and a first platform coupled to the first base, the first platform including a top surface, a first end with a first end face, an opposite second end with a second end face, and a main body portion extending along a horizontal axis between the first end and the second end, wherein the first end of the first platform includes a mechanical stop extending upwardly from the top surface to the first end face, wherein the second end of the first platform is substantially planar and extends along the horizontal axis in alignment with the main body portion, and wherein the second end face is substantially orthogonal relative to the horizontal axis and the top surface of the first platform, the second end face of the second end vertically offset from the first end face of the first end;

a second base including a first leg and a second leg spaced apart from one another;

a second platform coupled to the second base, the second platform including a top surface, a first end with a first end face, an opposite second end with a second end face, and a main body portion extending along a horizontal axis between the first end and the second end, wherein the first end of the platform includes a mechanical stop extending upwardly from the top surface to the first end face, wherein the second end of the platform is substantially planar and extends along the horizontal axis in alignment with the main body portion, and wherein the second end face is substantially orthogonal relative to the horizontal axis and the top surface of the platform, the second end face of the second end vertically offset from the first end face of the first end; and a support bar extending across and coupling the first base and the second base with one another.

16. The system of claim 15, wherein the support bar includes a first bar member slidably received within and extendable relative to a second bar member to facilitate adjustments of a length of the support bar.

17. The system of claim 15, wherein the second end face of the first base faces the second end face of the second base.

18. The system of claim 15, wherein the first base further includes a third leg extending downwardly from the second end of the first platform, and wherein the second base further includes a corresponding third leg extending downwardly from the second end of the second platform, the support bar extending across and coupling the third leg of the first base with the corresponding third leg of the second base.

19. A vehicle stand system comprising:

a base including a first leg and a second leg spaced apart from one another;

a first foot having an elongated foot platform on a top portion thereof, wherein the first leg of the base is coupled to the first foot along the elongated foot platform, the foot platform further including a first wall and a second wall spaced apart from one another and each extending downwardly from an underside thereof;

a second foot having an elongated foot platform on a top portion thereof, wherein the second leg of the base is coupled to the second foot along the elongated foot platform, the foot platform further including a first wall and a second wall spaced apart from one another and each extending downwardly from an underside thereof; and a platform coupled to the base, the platform including a top surface, a first end with a first end face, an opposite second end with a second end face, and a main body portion extending along a horizontal axis between the first end and the second end, wherein the first end of the platform includes a mechanical stop extending upwardly from the top surface to the first end face, wherein the second end of the platform is substantially planar and extends along the horizontal axis in alignment with the main body portion, and wherein the second end face is substantially orthogonal relative to the horizontal axis and the top surface of the platform, the second end face of the second end vertically offset from the first end face of the first end.

20. A vehicle stand system comprising:

a base including a first leg and a second leg spaced apart from one another;

a first foot having an elongated foot platform on a top portion thereof, wherein the first leg of the base is coupled to the first foot along the elongated foot platform, and wherein the elongated foot platform further includes an anti-skid layer disposed along an underside thereof;

a second foot having an elongated foot platform on a top portion thereof, wherein the second leg of the base is coupled to the second foot along the elongated foot platform, and wherein the elongated foot platform further includes an anti-skid layer disposed along an underside thereof; and a platform coupled to the base, the platform including a top surface, a first end with a first end face, an opposite second end with a second end face, and a main body portion extending along a horizontal axis between the first end and the second end, wherein the first end of the platform includes a mechanical stop extending upwardly from the top surface to the first end face, wherein the second end of the platform is substantially planar and extends along the horizontal axis in alignment with the main body portion, and wherein the second end face is substantially orthogonal relative to the horizontal axis and the top surface of the platform, the second end face of the second end vertically offset from the first end face of the first end.

* * * * *